United States Patent [19]

Phillippi

[11] Patent Number: 5,069,553

[45] Date of Patent: Dec. 3, 1991

[54] PROTECTIVE SHEATH FOR A CONTINUOUS MEASUREMENT THERMOCOUPLE

[75] Inventor: R. Michael Phillippi, Highland, Md.

[73] Assignee: Vesuvius Crucible Company, Pittsburgh, Pa.

[21] Appl. No.: 621,859

[22] Filed: Dec. 4, 1989

[51] Int. Cl.$^5$ .................... G01K 1/10; H01 35/10
[52] U.S. Cl. .................... 374/140; 136/234; 164/150; 266/87
[58] Field of Search ............ 374/100, 139, 140, 208; 266/79, 87, 88, 94, 99; 136/230, 232, 234; 164/150

[56] References Cited

U.S. PATENT DOCUMENTS

| | | | |
|---|---|---|---|
| 3,395,908 | 8/1968 | Woodcock | 266/94 |
| 3,580,744 | 5/1971 | Shingo Inonye et al. | 374/139 |
| 3,763,704 | 10/1973 | Blan et al. | 266/99 |
| 4,018,624 | 4/1977 | Rizzolo | 136/230 |
| 4,126,026 | 8/1980 | Kunta | 136/234 |
| 4,413,810 | 11/1983 | Tenberg et al. | 266/94 |
| 4,485,263 | 11/1984 | Itoyama et al. | 374/208 |
| 4,721,533 | 1/1988 | Phillippi et al. | 136/234 |
| 4,721,534 | 1/1988 | Phillippi et al. | 136/234 |
| 4,749,416 | 6/1988 | Greenspan | 136/232 |
| 4,778,281 | 10/1988 | Falk | 374/140 |
| 4,880,212 | 11/1989 | Hägglund et al. | 266/99 |
| 4,984,904 | 2/1991 | Nakano et al. | 374/139 |

FOREIGN PATENT DOCUMENTS

| | | | |
|---|---|---|---|
| 0086714 | 5/1982 | Japan | 374/208 |
| 0213735 | 9/1986 | Japan | 374/139 |
| 0420889 | 3/1974 | U.S.S.R. | 374/140 |
| 1236326 | 1/1986 | U.S.S.R. | 374/208 |

Primary Examiner—Daniel M. Yasich
Attorney, Agent, or Firm—Webb, Burden, Ziesenheim & Webb

[57] ABSTRACT

Disclosed is a protective thermocouple sheath of a magnesia graphite refractory material for use in continuous temperature measurements of molten metal in a metallurgical ladle and having a basic slag layer thereon. The sheath includes an elongated torpedo-shaped sheath body formed of a refractory composition and having an interior borehole extending axially therethrough and adapted to receive a thermocouple. The sheath body includes a lower end which is closed about the borehole and forms a narrow, tapered tip. The sheath body also includes a first body portion integral with the tapered tip and having a relatively constant cross section and providing a thin wall around the borehole. The sheath body also includes a second body portion having a relatively constant cross section larger than the cross section of the first body portion and providing a thicker wall around the borehole. The borehole terminates in an open end at the second body portion. The tapered tip is adapted to penetrate the slag layer and the thicker second body portion and its magnesia constituent material are adapted to withstand chemical attack thereon from the slag layer. The graphite constituent improves thermal conductivity of the refractory material and, thus, enhances the thermal responsiveness of the device.

19 Claims, 2 Drawing Sheets

PROTECTIVE SHEATH FOR A CONTINUOUS MEASUREMENT THERMOCOUPLE

BACKGROUND OF THE INVENTION

1. Government Rights

The Government has rights in this invention pursuant to Subcontract No. EGG-C87-101653 under Contract No. DE-AC07-76ID01570 awarded by the U.S. Department of Energy.

2. Field Of The Invention

This invention relates to ladle metallurgy and, more particularly, to the continuous temperature measurement of a molten metal in a ladle.

3. Description Of The Prior Art

Many industrial and scientific processes require the measurement and control of extremely high temperatures. For example, measuring the temperature of a molten metal is essential to proper process control in the metal processing industry. Two commonly used instruments to determine the temperature of a molten metal are the optical pyrometer and the disposable lance thermocouple. However, each of these devices has its disadvantages. The optical pyrometer is not as accurate as desirable, and can measure only the surface temperature of the molten metal. This is a particular problem when attempting to measure the temperature of a slag encrusted molten metal in a ladle. The disposable lance thermocouple is inaccurate, does not permit continuous measurement of the temperature of the molten metal, is expensive in the long run since a new thermocouple is used each time a measurement is desired, and its use involves safety problems for the person using it.

The ability to continuously monitor temperature during treatment of molten metal in a metallurgical ladle would greatly reduce energy consumption. It has been estimated that direct energy costs savings would exceed 25¢ per ton if continuous measurements were made in ladle metallurgy operations. Other benefits of continuously monitoring ladle temperatures include the ability to measure high temperature phase changes, chemical reactions, and other related phenomena.

There are certain problems in connection with measuring the temperature of molten metal in a ladle that the prior art has not heretofore overcome. These problems include extremely aggressive slags, thermal shock, violent turbulence from chill scrap additions, argon stirring, splashing and skulling, and mechanical fixturing difficulties. Sheathed thermocouples for measuring molten metal temperatures have been developed as shown in, for example, U.S. Pat. Nos. 4,721,533, 4,721,534, 4,746,534 and 4,749,416. However, in accordance with these prior art arrangements, the sheath is permanently installed in a sidewall of a tundish or other vessel. The structures shown in these patents have been found to be unsuitable for use in connection with a moveable probe to penetrate a slag layer in the continuous temperature measurement of molten metal in a metallurgical ladle.

Accordingly, it is an object of the present invention to provide a thermocouple sheath which can be used in connection with a probe penetrating a slag layer in the continuous temperature measurement of molten metal within a metallurgical ladle. It is also an object to provide such a thermocouple sheath in an arrangement which would have good thermal conductivity and would withstand the chemical attack of the basic (not acidic) slag layer which forms on molten steel contained in a ladle. It is also an object to provide a thermocouple sheath which would effectively measure the temperature continuously but would be reusable for future measurements.

SUMMARY OF THE INVENTION

Therefore, I have invented a protective thermocouple sheath for use in continuous temperature measurements of molten metal in a metallurgical ladle and having a slag layer thereon. The sheath includes an elongated torpedo-shaped sheath body formed of a refractory composition and having an interior borehole extending axially therethrough and adapted to receive a thermocouple. The sheath body includes a lower end which is closed about the borehole and forms a narrow, tapered tip. The sheath body also includes a first body portion integral with the tapered tip and having a relatively constant cross section and providing a thin wall around the borehole. The sheath body also includes a second body portion having a relatively constant cross section larger than the cross section of the first body portion and providing a thicker wall around the borehole. The borehole terminates in an open end at the second body portion. The tapered tip is adapted to penetrate the slag layer and the second body portion is adapted to withstand attack thereon from the slag layer.

In a preferred embodiment, the sheath body includes a first tapered portion which tapers outwardly from a narrow first closed end to one end of a first cylindrical portion having an outer diameter substantially larger than the diameter of the first closed end. The preferred sheath body also includes a second tapered portion which tapers outwardly from the other end of the first cylindrical portion to a second cylindrical portion having an outer diameter substantially larger than the outer diameter of the first cylindrical portion. The second cylindrical portion terminates in a second end of the sheath body.

The thermocouple sheath is particularly adapted for measuring the temperature of a slag encrusted molten metal, such as molten steel, in which the ladle is positioned at a ladle treatment facility. A sheathed thermocouple probe is moved through the slag layer and into the molten metal with the second body portion or second cylindrical portion in contact with the slag layer. The temperature in the molten metal is measured by detecting currents generated by a thermocouple within the probe. The probe can then be withdrawn from the molten metal for use in subsequent measurements.

It is preferred that the cylindrical portions or body portions of the thermocouple sheath be substantially longer than each of the tapered portions. In addition, the portion of the borehole within the tapered tip preferably has a diameter smaller than the diameter of the remainder of the borehole. The annulus formed between the borehole and a thermocouple placed therein can be filled with an alumina powder. It is preferred that the sheath body be formed of an isopressed magnesia and graphite composite.

DETAILED DESCRIPTION OF THE PREFERRED EMBODIMENTS

Figure 1:
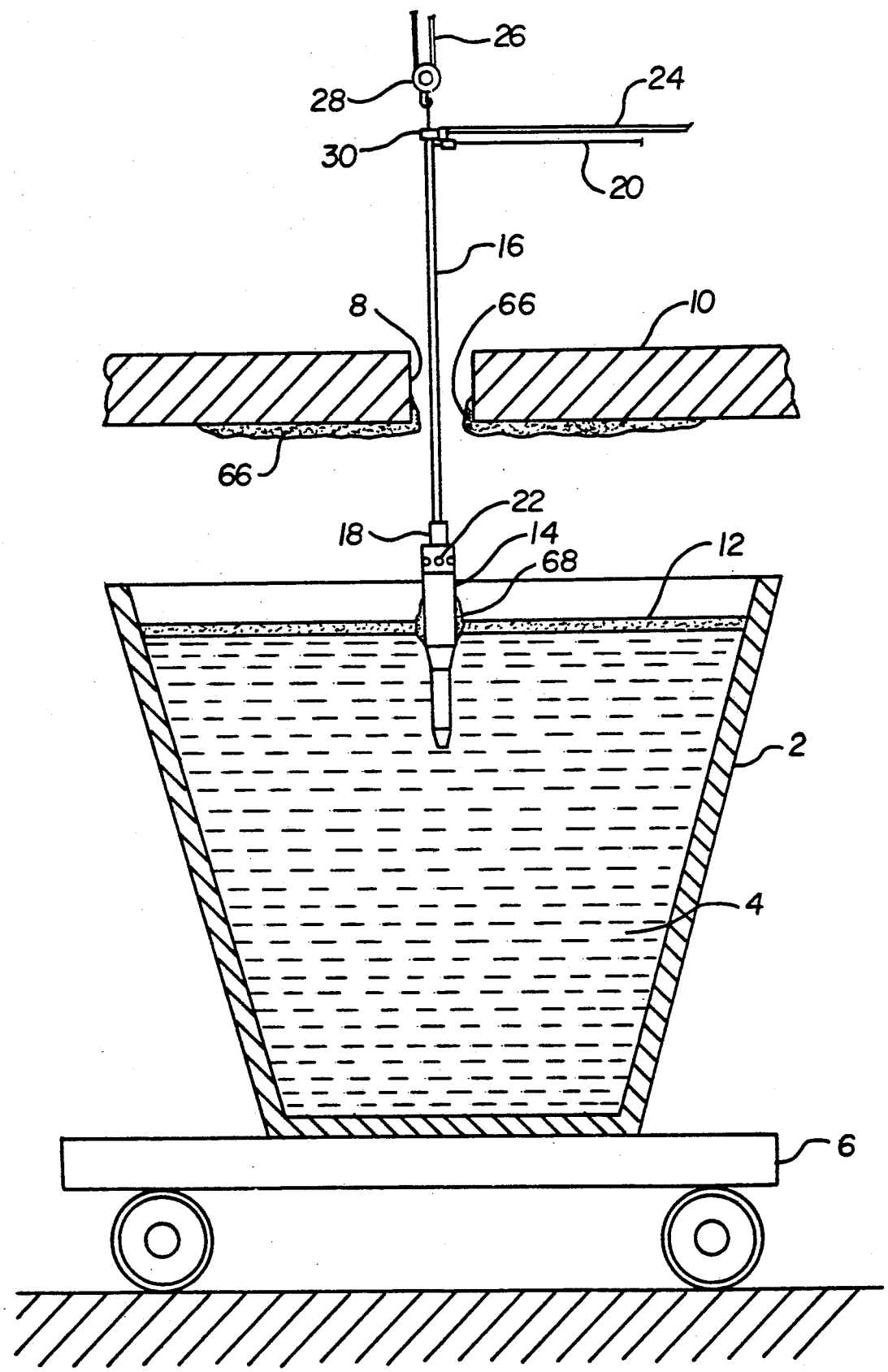
FIG. 1 is a side view, partially in section, showing a ladle treatment facility utilizing a thermocouple probe in accordance with the present invention.

A ladle treatment facility utilizing the sheathed thermocouple probe of the present invention is shown in FIG. 1. An open topped ladle 2 containing a quantity of molten metal 4, such as molten steel, is carried by a moveable ladle car 6 to a position beneath a ladle access port 8 of a ladle treatment platform 10 located above the ladle 2 and spaced therefrom. As is well known in the art, the molten metal will have a crusty slag layer 12 formed on its exposed surface. A basic (not acidic) slag layer will form on the upper surface of molten steel in the ladle 2. At the ladle treatment facility, various elements can be added to the molten metal 4 or various operations can be carried out thereupon. It is common in the field to, for example, stir the molten metal 4 with argon, or add chill scrap or other alloying agents, or add heat.

In accordance with the present invention, a torpedo-shaped thermocouple probe 14 is attached to an elongated immersion lance 16 by an adapter assembly 18. The thermocouple probe 14 will be described hereinafter in more detail in connection with FIGS. 2-4. The immersion lance 16 is an elongated pipe or tube which carries therein argon from an argon line 20 to supply cooling argon gas to the immersion lance 16 and to the adapter assembly 18. The adapter assembly 18 includes a plurality of argon exit holes 22 which permit the cooling argon gas to flow from the adapter assembly 18. The immersion lance 16 also carries therein a pair of electrical leads 24 which extend from the thermocouple (not shown in FIG. 1) carried within the thermocouple probe 14. The electrical leads 24 are cooled by the argon gas within the immersion lance 16 so that measured readings are not affected by heat radiation or splatter. Since the assembly formed by the immersion lance 16, adapter assembly 18 and thermocouple probe 14 is typically rather long (approximately 3½ feet) and heavy, it is carried, for example, by an overhead crane (not shown) via cable 26 and pulley 28 connected between the crane and the upper end 30 of the immersion lance 16.

Figure 2:
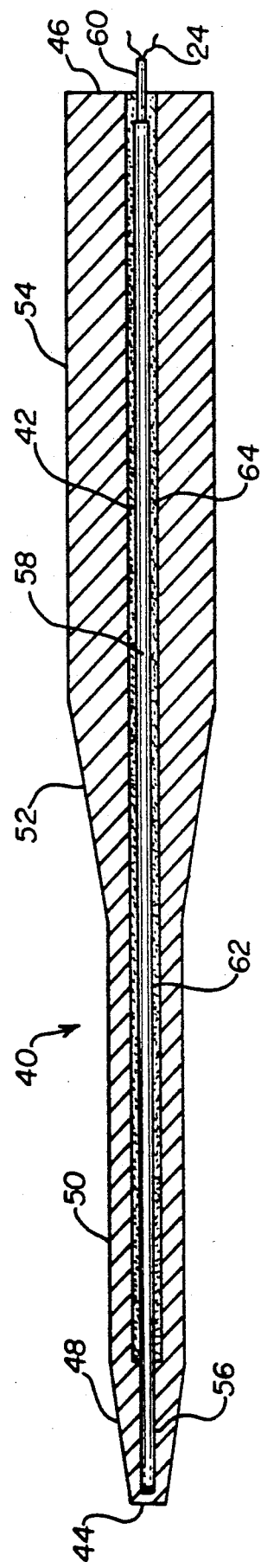
FIG. 2 is a section taken through the thermocouple probe shown in FIG. 1.
Figure 4:
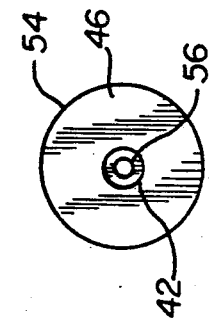
FIG. 4 is a rear view of the thermocouple probe shown in FIG. 2, with the thermocouple removed.
Figure 3:
FIG. 3 is a front view of the thermocouple probe shown in FIG. 2.

Referring now to FIGS. 2-4, a configuration of the torpedo-shaped thermocouple probe 14 attached to the immersion lance 16 is shown. The thermocouple probe 14 includes an outer thermocouple sheath 40 formed of a refractory composition, preferably an isopressed magnesia (magnesium oxide) and graphite composite. The magnesia refractory material is particularly suitable for resisting the chemical attack of basic slags while the graphite constituent serves to increase the thermal conductivity which improves the thermal responsiveness of the refractory composite, thus, making the temperature measurements more reliable. Flake-type graphite may be present in an amount between about 10-30 wt. % and preferably between about 25-30 wt. %.

The body of the thermocouple sheath 40 has an interior borehole 42 extending axially therein from a closed first end 44 to an open second end 46. The sheath 40 body is formed in a particular shape and includes a first tapered portion 48 at the closed first end 44 which tapers outwardly from the closed first end 44 to one end of a first cylindrical portion 50 having an outer diameter substantially larger than the diameter of the closed first end 44. The first cylindrical portion 50 has a length which is substantially longer than that of the first tapered portion 48. The thermocouple sheath 40 further includes a second tapered portion 52 which tapers outwardly from the other end of the first cylindrical portion 50 to one end of a second cylindrical portion 54 having an outer diameter substantially larger than the outer diameter of the first cylindrical portion 50. The second cylindrical portion 54, like the first cylindrical portion 50, has a length which is substantially longer than either the first or second tapered portions 48, 52. The second cylindrical portion 54 terminates at its opposite end at the second end 46 of the thermocouple sheath 40.

The borehole 42 extends through the body of the thermocouple sheath 40 from the second end 46, through the second cylindrical portion 54, second tapered portion 52, first cylindrical portion 50, and into the first tapered portion 48, where it terminates at a short, but definite, distance from the first end 44 of the sheath 40. It is preferred that a portion 56 of the borehole 42 within the first tapered portion 48 of the sheath 40 be slightly narrower than the remainder of the borehole 42 and that the inner diameter of the narrowed borehole 56 in the first tapered portion 48 be just slightly larger than the outer diameter of an elongated thermocouple assembly 58 positioned within the borehole 42.

While any of the known thermocouple assemblies can be used in the thermocouple sheath 40, the particular thermocouple shown in FIG. 2 is a type B thermocouple and includes an inner insulator 60 formed of high purity (99.8%) alumina and carrying a pair of spaced boreholes for the thermocouple leads 24. A high purity alumina closed end sleeve 62 surrounds the inner insulator 60 along substantially its entire length. The portion of the alumina sleeve 62 positioned in the narrowed borehole 56 within the first tapered portion 48 completely encloses both the inner insulator 60 and also a thermocouple junction (not shown) between the thermocouple leads 24 within the first tapered portion 48. An annulus is formed around the thermocouple 58 between the closed end sleeve 62 and the borehole 42 in the portion of the sheath defined by the first cylindrical portion 50, second tapered portion 52 and second cylindrical portion 54. The annulus provides sufficient clearance to enable the rather long thermocouple 58 to be readily inserted into the borehole 42 without breaking. This annulus can then be filled by tamping therein dead burned (fully reacted) alumina powder 64, such as alumina powder having a particle size of -325 mesh. The alumina powder 64 helps to secure the thermocouple 58 within the sheath 40.

The thermocouple sheath 40 is, therefore, seen to have a first or lower end which is closed about a thermocouple therein and has a narrow, tapered or conical tip. This lower end and tip area merges into a first portion (the first cylindrical portion 50) having a relatively constant cross section and thickness and providing a thinner wall around the borehole, i.e. between the borehole 42 and outer sheath surface. The first portion then merges, preferably by a tapered transition (the second tapered portion 52), into a second portion (the second cylindrical portion 54) having a relatively constant cross section and thickness and providing a thicker wall around the borehole, i.e. between the borehole 42 and outer sheath surface. Each area performs a particular function which will be described hereinafter in more detail.

Referring once again to FIG. 1, the use of the thermocouple probe 14 in the continuous measurement of the temperature of molten metal in a ladle in accordance with the present invention will be described. Before the ladle car 6 carrying the ladle 2 and molten metal 4 is moved beneath the ladle access port 8, the immersion lance 16 and thermocouple probe 14 are completely withdrawn from the ladle access port 8 and are typically positioned well above the ladle treatment platform 10. The ladle 2 is then moved beneath the ladle access port 8. The overhead crane lowers the immersion lance 16 until the narrow, conical end, or first tapered portion 48, of the thermocouple probe 14 comes into contact with the slag layer 12. The immersion lance 16 is continually lowered causing the thermocouple probe 14 to pierce the thick and difficult to penetrate slag layer 12. This results from the shape of the probe 14, as well as its great weight. A sheath manufactured and tested by the applicant had the following dimensions: (a) overall length, 1067mm; (b) length of first tapered portion, 100mm; (c) length of first cylindrical portion, 406mm; (d) length of second tapered portion, 150mm; (e) length of second cylindrical portion, 511mm; (f) diameter of closed end, 25mm; (g) diameter of first cylindrical portion, 53mm; (h) diameter of second cylindrical portion, 102mm; (i) diameter of borehole, 13mm; (j) diameter of narrowed portion of borehole, 9.5mm; and (k) space between inner end of borehole and closed end, 10mm.

The immersion lance 16 is further lowered until the entire length of the first tapered portion 48, first cylindrical portion 50 and second tapered portion 52 of the thermocouple probe 14 are within the molten metal 4 and through the slag layer 12. The second cylindrical portion 54 of the probe 14 extends partially within the molten metal 4 but is primarily in contact with the slag layer 12. It is seen in FIG. 1 that during the treatment operation at this location that splatter build-up of both slag and metal will be formed on the lower surface of the ladle treatment platform 10 and on the ladle access port 8 (reference number 66), and also on the outer surface of the thermocouple probe 14 at the wider second cylindrical portion 54 (reference number 68).

The narrower first tapered portion 48 of the thermocouple probe 14 permits the probe 14 to pierce the slag layer 12. In addition, the thermal response of the isopressed and fired magnesia graphite refractory composition of the thermocouple sheath 40, as well as the first tapered portion 48, permits a desirable thermal response which conducts heat from the molten metal 4 to the thermocouple 58 within the probe 14. This thermal conductivity is also assisted by making the first cylindrical portion 50 relatively thin in comparison to the second cylindrical portion 54. The thicker second cylindrical portion 54 of the thermocouple sheath 40 and magnesia composition provides sufficient mechanical strength and slag erosion resistance (to the basic slag) to provide continuous protection for the thermocouple probe 14 while it is in the ladle bath.

Once the treatment of the molten metal 4 in the ladle 2 is complete, the immersion lance 16 is drawn upwardly, removing the thermocouple probe 14 from the molten metal 4 and up through the ladle access port 8. By utilizing this structure for the thermocouple probe 14, the thermocouple 58 contained within the sheath 40 is continually protected, provides good thermal response and accurate measurements, and also provides continuous temperature measurements. The thermocouple probe 14 can be reused in subsequent measurements.

The present invention provides a tremendous advantage over prior art devices. Temperature measurement during ladle treatment has long been recognized as a key element in the assurance of steel quality. Many factors beyond the control of operators can influence steel temperature which emphasizes the need for real time measurement. For example, the addition of chill scrap is not precise in many cases. In addition, the type of scrap added can have a significant effect because of the relative specific heats and associated chemical activity. Also, the development of the slag layer on the liquid steel seriously effects the natural cooling rate and the amount of slag can vary with time. The slag layer breaks up when the ladle car moves the ladle into position for treatment, which further exposes the liquid steel. Subsequent to the treatment, the slag layer reforms and further insulates the steel from radiant heat loss. The effect of the nature of slag on steel temperature, the rate at which it reforms, and the depth to which it will develop are presently left to human judgment. Argon stirring, a common practice during ladle treatment, is also less than precise. Estimated numbers for the cooling rate during the stir are used by operators. Stirring lance configuration, argon flow rate, and size can also have a dramatic effect on the cooling rate of the liquid steel. A more subtle, but important effect, is on the previous thermal history of the ladle. A ladle which is "on-the-run" in comparison with a ladle which has come from the dryer exhibits very different cooling rates during treatment. Continuous measurement of the ladle steel during treatment, which the present invention does provide, will alleviate the guess work currently required during this critical operation. Most significantly, with all considerations assessed, continuous measurement would afford a reduction in BOF superheat, reducing consumed energy by a dramatic amount. Moreover, this can lead to additional refractory life of the BOF and ladle linings by not subjecting them to unnecessary heat.

Having described above the presently preferred embodiments of this invention, it is to be understood that it may be otherwise embodied within the scope of the appended claims.

I claim:

1. A protective thermocouple sheath for use in continuous temperature measurements of molten metal in a ladle and having a slag layer thereon, said sheath comprising an elongated, torpedo-shaped sheath body formed of a refractory composition consisting of magnesia and graphite and having an interior borehole extending axially therein and adapted to receive a thermocouple assembly, said sheath body including a first tapered portion which tapers outwardly from a narrow first closed end to one end of a first cylindrical portion having an outer diameter substantially larger than the diameter of said first closed end, said sheath body further including a second tapered portion which tapers outwardly from the other end of said first cylindrical portion to a second cylindrical portion having an outer diameter substantially larger than the outer diameter of said first cylindrical portion, said second cylindrical portion terminating in a second end of said sheath body, with said borehole extending from the second end, through the second cylindrical portion, second tapered portion and first cylindrical portion and terminating within the first tapered portion, with said first closed end and first tapered portion adapted to penetrate said slag layer, and with said second cylindrical portion adapted to withstand attack thereon from the slag layer.

2. The thermocouple sheath of claim 1 wherein each cylindrical portion is substantially longer than each of said tapered portions.

3. The thermocouple sheath of claim 1 wherein a portion of the borehole within the first tapered portion has a diameter smaller than the diameter of the remainder of the borehole.

4. A protective thermocouple sheath for use in continuous temperature measurements of molten metal in a ladle and having a slag layer thereon, said sheath comprising an elongated torpedo-shaped sheath body formed of a refractory composition consisting of magnesia and graphite and having an interior borehole extending axially therein and adapted to receive a thermocouple assembly, said sheath body including a lower end which is closed about the borehole and forms a narrow, tapered tip, said body further including a first body portion integral with said tapered tip and having a relatively constant cross section and providing a thin wall around said borehole, and said body further including a second body portion having a relatively constant cross section larger than the cross section of the first body portion and providing a thicker wall around the borehole, and said borehole terminating in an open end at said second body portion, with said tapered tip adapted to penetrate said slag layer, and with said second body portion adapted to withstand attack thereon from the slag layer.

5. The thermocouple sheath of claim 4 wherein a portion of the borehole within the tapered tip has a diameter smaller than the diameter of the remainder of the borehole.

6. The thermocouple sheath of claim 4 further including a tapered body portion between and integral with said first body portion and said second body portion.

7. The thermocouple sheath of claim 6 wherein each body portion is substantially longer than each of said tapered portions.

8. A sheathed thermocouple probe adapted to continuously measure the temperature of molten metal in a ladle and having a slag layer thereon, said probe comprising an elongated torpedo-shaped body formed of a refractory composition consisting of magnesia and graphite and having an interior borehole extending axially thereon, and a thermocouple assembly positioned in said borehole and surrounded by said sheath body, with said sheath body including a lower end which is closed about the thermocouple and forms a narrow, tapered tip, said body further including a first body portion integral with said tapered tip and having a relatively constant cross section and providing a thin wall around said thermocouple, and said body further including a second body portion having a relatively constant cross section larger than the cross section of the first body portion, and providing a thicker wall around the thermocouple, and said borehole terminating in an open end at said second body portion, with said tapered tip adapted to penetrate said slag layer, and with said second body portion adapted to withstand attack thereon from the slag layer.

9. The thermocouple probe of claim 8 wherein a portion of the borehole within the tapered tip has a diameter smaller than the diameter of the remainder of the borehole.

10. The thermocouple probe of claim 9 wherein an annulus is formed between said thermocouple and said borehole in the first and second body portions and said annulus is filled with an alumina powder.

11. The thermocouple probe of claim 8 further including a tapered body portion between and integral with said first body portion and said second body portion.

12. The thermocouple probe of claim 11 wherein each body portion is substantially longer than each of said tapered portions.

13. The thermocouple probe of claim 8 wherein said thermocouple assembly is a type B thermocouple.

14. A method of continuously measuring the temperature of a slag encrusted molten metal in a metallurgical ladle comprising the steps of:
   a) positioning said ladle in a ladle treatment facility;
   b) positioning above said ladle a sheathed thermocouple probe including an elongated torpedo-shaped body formed of an isopressed refractory composition consisting of magnesia and graphite and having an interior borehole extending axially thereon, and a thermocouple assembly positioned in said borehole and surrounded by said sheath body, with said sheath body including a lower end which is closed about the thermocouple and forms a narrow, tapered tip, said body further including a first body portion integral with said tapered tip and having a relatively constant cross section and providing a thin wall around said thermocouple, and said body further including a second body portion having a relatively constant cross section larger than the cross section of the first body portion and providing a thicker wall around the thermocouple, and said borehole terminating in an open end at said second body portion, with said tapered tip adapted to penetrate said slag layer, and with said second body portion adapted to withstand attack thereon from the slag layer;
   c) moving the sheathed thermocouple probe through the slag layer and into the molten metal with the second body portion in contact with the slag layer;
   d) measuring the temperature in the molten metal by detecting the current generated by said thermocouple within said probe; and
   e) then withdrawing said sheathed thermocouple probe from the molten metal.

15. The method of claim 14 wherein a portion of the borehole within the tapered tip has a diameter smaller than the diameter of the remainder of the borehole.

16. The method of claim 15 wherein an annulus is formed between said thermocouple and said borehole in the first and second body portions and said annulus is filled with an alumina powder.

17. The method of claim 14 wherein said molten metal is molten steel.

18. The method of claim 14 wherein said sheath body includes a first tapered portion which tapers outwardly from a narrow first closed end to one end of a first cylindrical portion having an outer diameter substantially larger than the diameter of said first closed end, said sheath body further including a second tapered portion which tapers outwardly from the other end of said first cylindrical portion to a second cylindrical portion having an outer diameter substantially larger than the outer diameter of said first cylindrical portion, said second cylindrical portion terminating in a second end of said sheath body.

19. The method of claim 18 wherein each cylindrical portion is substantially longer than each of said tapered portions.

* * * * *

UNITED STATES PATENT AND TRADEMARK OFFICE
CERTIFICATE OF CORRECTION

PATENT NO. : 5,069,553

DATED : December 3, 1991

INVENTOR(S) : R. Michael Phillippi

It is certified that error appears in the above-identified patent and that said Letters Patent is hereby corrected as shown below:

On the title page under References Cited U.S. PATENT DOCUMENTS
"3,763,704 10/1973 Blan et al. 266/99" should read
--3,763,704 10/1973 Blau et al. 266/99--.
and
"4,126,026 8/1980 Kunta 136/234" should read
--4,216,028 8/1980 Kurita 136/234--.

Signed and Sealed this

Twentieth Day of April, 1993

*Attest:*

MICHAEL K. KIRK

*Attesting Officer*  Acting Commissioner of Patents and Trademarks